United States Patent
Kapoor

(10) Patent No.: US 8,891,020 B2
(45) Date of Patent: Nov. 18, 2014

(54) METHOD AND APPARATUS FOR AUTOMATICALLY CATEGORIZING POTENTIAL SHOT AND SCENE DETECTION INFORMATION

(75) Inventor: Anand Kapoor, Paramount, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 841 days.

(21) Appl. No.: 12/449,012

(22) PCT Filed: Dec. 11, 2007

(86) PCT No.: PCT/US2007/025339
§ 371 (c)(1),
(2), (4) Date: Jul. 20, 2009

(87) PCT Pub. No.: WO2008/127319
PCT Pub. Date: Oct. 23, 2008

(65) Prior Publication Data
US 2010/0007793 A1    Jan. 14, 2010

Related U.S. Application Data

(60) Provisional application No. 60/898,660, filed on Jan. 31, 2007.

(51) Int. Cl.
H04N 9/64 (2006.01)
H04N 5/14 (2006.01)
H04N 19/103 (2014.01)
H04N 19/142 (2014.01)
H04N 19/61 (2014.01)

(52) U.S. Cl.
CPC ......... H04N 19/00781 (2013.01); H04N 5/147 (2013.01); H04N 19/00018 (2013.01); H04N 19/00163 (2013.01)
USPC .......................................................... 348/701

(58) Field of Classification Search
CPC .............. H04N 5/14; H04N 19/00018; H04N 19/00163; H04N 19/00781
USPC .................................................. 348/700, 701
IPC ......................................................... H04N 7/12
See application file for complete search history.

(56) References Cited

U.S. PATENT DOCUMENTS 6,909,745 B1 * 6/2005 Puri et al. ................. 375/240.01
7,075,581 B1    7/2006 Ozgen et al.
(Continued)

FOREIGN PATENT DOCUMENTS

EP    0938054    8/1999
EP    1132812    9/2001
(Continued)

OTHER PUBLICATIONS

Cheng et al.: "Scene-adaptive video partitioning by semantic object tracking," Online www.sciencedirect.com, Journal of Visual Communication and Image Representation, vol. 17, No. 1, available online Apr. 1, 2005, Academic Press, Feb. 2006, pp. 72-97.

(Continued)

Primary Examiner — Richard Torrente
(74) Attorney, Agent, or Firm — Robert D. Shedd; Jeffrey M. Navon

(57) ABSTRACT

A method and apparatus are provided for categorizing pre-processing video information derived from video content prior to processing the video content. The apparatus includes a categorizer for identifying at least one of scenes and shots in the video content that have a likelihood of causing errors during subsequent processing based on at least the pre-processing video information. Moreover, the categorizer is for categorizing the identified scenes and shots into one or more respective categories based on at least the pre-processing video information.

22 Claims, 3 Drawing Sheets

(56) References Cited

U.S. PATENT DOCUMENTS

| | | | | |
|---|---|---|---|---|
| 7,110,454 | B1* | 9/2006 | Chakraborty | 375/240.16 |
| 2001/0055337 | A1* | 12/2001 | Matsuzaki et al. | 375/240.12 |
| 2002/0126758 | A1 | 9/2002 | Blanchard | |
| 2005/0089224 | A1* | 4/2005 | Aoki | 382/173 |
| 2006/0152634 | A1 | 7/2006 | Yeh et al. | |

FOREIGN PATENT DOCUMENTS

| | | |
|---|---|---|
| JP | 2005057493 | 3/2005 |
| JP | 2005301641 | 10/2005 |
| JP | 2006311079 | 11/2006 |
| WO | WO9962265 | 12/1999 |
| WO | WO2006092765 | 9/2006 |
| WO | WO2006099082 | 9/2006 |

OTHER PUBLICATIONS

Fu et al.: "Mining Video Hierarchical Structure for Efficient Management and Access," IEEE Proceedings of the Fifth Int'l. Conference on Machine Learning and Cybernetics, Dalian, China, Aug. 13-16, 2006, pp. 1013-1018.

Han et al.: "A Novel Feature Weighted Clustering Algorithm Based on Rough Sets for Shot Boundary Detection," Fuzzy Systems and Knowledge Discovery, FSKD 2006, $3^{rd}$ Int'l. Conference in Xi'an, China, Sep. 24-28, 2006, Springer, Berlin, Germany, pp. 471-480.

Han et al.: "A Unified Framework for Shot Boundary Detection," Proceedings of Int'l. Conference on Computational Intelligence and Security, Part I, CIS 2005, Xi'an, China, Dec. 15-19, 2005, Springer-Verlag, Berlin, Germany, pp. 997-1002.

Han et al.: "Cut-before-Detection and Hierarchical Detection Algorithm for Video Shot Segmentation," System Engineering and Electronics, vol. 27, No. 2, Feb. 2005, Science Press, China, pp. 361-364.

Hasebe et al.: "Two-Step Detection of Video Shot Boundaries in a Wavelet Transform Domain," Journal of the Institute of Image Electronics Engineers of Japan, vol. 34, No. 1, Jan. 2005, Gazo Denshi Gakkai, Japan, pp. 17-26.

Hua et al.: "Construction of Video Scenes Based on Shots," Mini-Micro Systems, China, vol. 21, No. 6, pp. 591-594, Jun. 2000.

Lang et al.: "Automatic Key-Frames Extraction to Represent a Video," Proceedings of $7^{th}$ Int'l Conference on Signal Processing, Beijing, China, Aug. 31-Sep. 4, 2004, ICSP'04, IEEE, Piscataway, NJ, USA, pp. 741-744.

Lee et al.: "Video scene change detection using neural network: Improved ART2," Expert Systems with Applications, vol. 31, No. 1, pp. 13-25, Jul. 2006, Elsevier, UK.

Liang et al.: "A New Content-Based Hybrid Video Transcoding Method," Proceedings of Int'l. Conference on Image Processing, ICIP 2001, Greece, Oct. 7-10, 2001, IEEE, NY, NY, USA, vol. 1, pp. 429-432.

Liu et al.:"Fast Scene Segmentation Using Multi-level Feature Selection," 2003 Int'l. Conference on Multimedia and Expo, ICME 2003, Jul. 6-9, 2003, IEEE, pp. III-325-8.

Lo et al.: "A histogram-based moment-preserving clustering algorithm for video segmentation," Pattern Recognition Letters, vol. 24, No. 14, pp. 2209-2218, Oct. 2003, Elsevier, Netherlands.

Lu et al.: "An Accumulation Algorithm for Video Shot Boundary Detection," Multimedia Tools and Application, vol. 22, No. 1, pp. 89-106, Jan. 2004, Kluwer Academic Publishers, Netherlands.

Wang et al.: "A Mid-Level Scene Change Representation VIA Audio-visual Alignment," 2006 IEEE Int'l. Conference on Acoustics, Speech, and Signal Processing, ICASSP 2006, Piscataway, NJ, USA, pp. II-409-II-412.

Zheng et al.: "An Efficient Algorithm for Video Shot Boundary Detection," Proceedings of 2004 Int'l. Symposium on Intelligent Multimedia, Video and Speech Processing, Oct. 20-22, 2004, Hong Kong, pp. 266-269.

Zhou et al.: "An Efficient Scene Detection Using Rough Set-Based Fuzzy Clustering for Film Video," $6^{th}$ World Congress on Intelligent Control and Automation, Dalian, China, Jun. 21-23, 2006, IEEE Piscataway, NJ, USA.

International Search Report, dated Jun. 29, 2009.

* cited by examiner

METHOD AND APPARATUS FOR AUTOMATICALLY CATEGORIZING POTENTIAL SHOT AND SCENE DETECTION INFORMATION

CROSS-REFERENCE TO RELATED APPLICATIONS

This application claims the benefit, under 35 U.S.C. §365 of International Application PCT/US2007/025,339, filed 11 Dec. 2007, which was published in accordance with PCT Article 21(2) on 23 Oct. 2008, in English and which claims the benefit of United States provisional patent application No. 60/898,660 filed 31 Jan. 2007.

TECHNICAL FIELD

The present principles relate generally to video preprocessing and, more particularly, to a method and apparatus for automatically categorizing potential shot and scene detection information.

BACKGROUND

This section is intended to introduce the reader to various aspect of art that may be related to various aspects of the present principles which are described and/or claimed below. This discussion is believed to be helpful in providing the reader with background information to facilitate a better understanding of the various aspects of the present principles. Accordingly, it should be understood that these statements are to be read in this light, and not as admissions of prior art.

Processing of digital video content often requires one or more preprocessing steps in order to make the subsequent processing steps more efficient. The processing may involve, but is not limited to, encoding. The pre-processing may involve, but is not limited to, shot detection and/or scene detection.

Often, the above mentioned preprocessing does not work on all possible video content. In any event, it is time-consuming and costly to verify pre-processing results against the video content to determine if any shots or scenes have been missed. Accordingly, there exists a need to identify and categorize the candidate scenes with a high likelihood of being missed and verify these candidate scenes at the onset of processing.

SUMMARY

These and other drawbacks and disadvantages of the prior art are addressed by the present principles, which are directed to a method and apparatus for automatically categorizing potential shot and scene detection information.

According to an aspect of the present principles, there is provided an apparatus for categorizing pre-processing video information derived from video content prior to processing the video content. The apparatus includes a categorizer for identifying at least one of scenes and shots in the video content that have a likelihood of causing errors during subsequent processing based on at least the pre-processing video information. Moreover, the categorizer is for categorizing the identified scenes and shots into one or more respective categories based on at least the pre-processing video information.

According to another aspect of the present principles, there is provided a method for categorizing pre-processing video information derived from video content prior to processing the video content. The method includes identifying at least one of scenes and shots in the video content that have a likelihood of causing errors during subsequent processing based on at least the pre-processing video information. Moreover, the method includes categorizing the identified scenes and shots into one or more respective categories based on at least the pre-processing video information.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
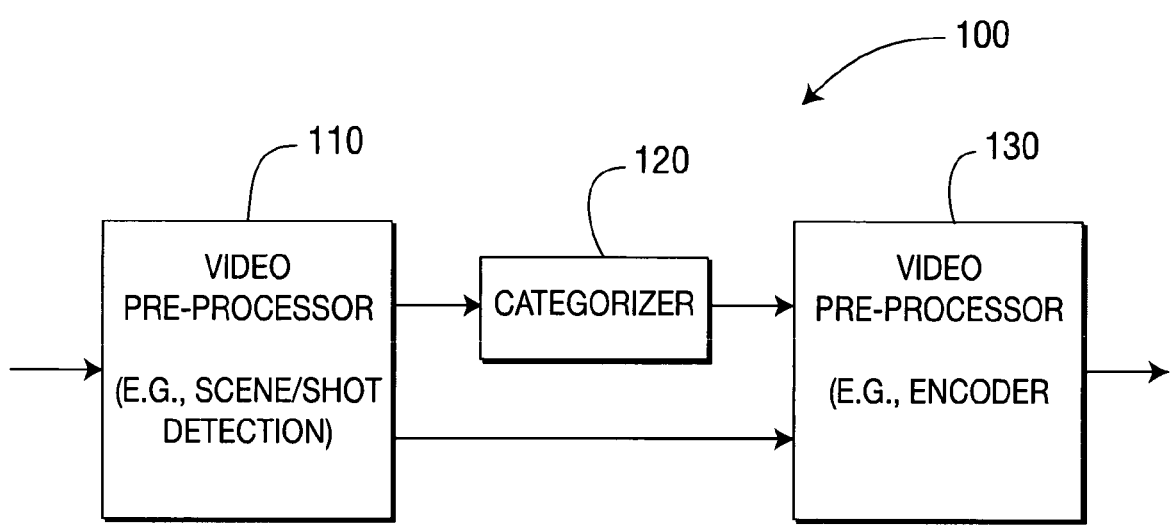
FIG. 1 is a block diagram for an exemplary high level block diagram illustrating an apparatus in accordance with an embodiment of the present principles.

The present principles are directed to a method and apparatus for automatically categorizing potential shot and scene detection information.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. Moreover, the use of "/" herein, as in "scenes/shots", is intended to encompass "scenes and/or shots" as described immediately herein before.

Moreover, it is to be appreciated that the present principles may be applied to video that is to be encoded using any video coding standard and/or recommendation, including extensions thereof, while maintaining the spirit of the present principles. For example, the present principles may be used with, but are not limited to, any of the following: the International Organization for Standardization/International Electrotechnical Commission (ISO/IEC) Moving Picture Experts Group-1 (MPEG-1) standard; the ISO/IEC MPEG-2 standard; the International Telecommunication Union, Telecommunication Sector (ITU-T) H.263 recommendation; the ISO/IEC MPEG-4 Part 10 Advanced Video Coding (AVC) standard/ITU-T H.264 recommendation (hereinafter the "MPEG-4 AVC standard"); and so forth.

Further, it is to be appreciated that while the present principles are described in one embodiment relating to an application where processing of scenes is performed on several scenes in parallel using parallel processors, the present principles are not limited solely to the preceding application and, thus, may be applied to other applications involving processing of video. That is, given the teachings of the present principles provided herein, one of ordinary skill in this and related arts will contemplate this and various other applications to which the present principles may be applied, while maintaining the spirit of the present principles.

It is to be appreciated that one or more embodiments of the present principles may involve and/or otherwise relate to scenes and/or shots. While the terms "scenes" and "shots" are known to those of ordinary skill in this and related arts, the following description is nonetheless provided to aid the reader in ascertaining what each may involve.

For example, scenes tend to be loosely used and are generally easier to understand and/or relate to. Moreover, with respect to film and film associated terms, the term "scene" may be used to refer to multiple shots (which generally may have a story and/or logical content associated therewith). Further, with respect to film, scenes tend to have a longer duration (than shots as described immediately hereinafter). It is to be noted that pre-processing algorithms applied to scenes are less sensitive to slow camera changes in such scenes.

In contrast, shots tend to be specifically used, and tend to involve camera changes (including, but not limited to, hardcuts). It is to be noted that pre-processing algorithms are typically sensitive to shots (for example, as compared to scenes). This is due to some characteristics that are often involved in shots, including, but not limited to, shots tending to have a relatively short duration (such as in, e.g., action films) or a relatively long duration (such as in, e.g., dramas), where such durations are really not optimal as far as their respective suitability for encoding.

One or more embodiments of the present principles are directed to categorized and indicating such characteristics and irregularities to enable the corresponding scenes and shots involved more suitable for post-processing such as, but not limited to, encoding and/or compression.

Turning to FIG. 1, an exemplary high level block diagram illustrating an apparatus in accordance with an embodiment of the present principles is indicated generally by the reference numeral 100. The apparatus 100 includes a video pre-processor 110, a categorizer 120, and a video processor 130. As described in further detail herein below, the video pre-processor 110 may be configured to receive and pre-process video data and output corresponding pre-processing information. Such pre-processing of the video data may involve, but is not limited to, for example, scene detection, shot detection, and so forth. Scene detection may be used to detect, but is not limited to, any of the following: scene cuts; dissolves; fade-ins; fade-outs; flashes; and so forth. The pre-processing information may include, but is not limited to, any of the following: detection of cuts; detection of fade-ins; detection of fade-outs; detection of dissolves; determination of scene lengths; and so forth.

The categorizer 120 receives the pre-processing information provided by the video pre-processor 110 and identifies, and optionally sorts, any scenes that have a high likelihood of being missed (e.g., due to being mis-categorized and/or missed altogether as being a certain type of scene and/or shot, and/or so forth), and provides categorization information. The video processor 130 receives the video data from the pre-processor 110 and the categorization information from the categorizer 120. The video processor 130 outputs processed video using the video data from the pre-processor 110 and the categorization information from the categorizer 120. The processed video may be, for example, a bitstream. Moreover, the bitstream may be encoded in compliance with one or more video coding standards and/or recommendations. In such a case, the video processor 130 includes an encoder.

It is to be appreciated that scene and/or shots are identified as having a likelihood (more likely than not) of causing errors during subsequent processing based on, for example, a threshold, history data, and so forth. It is to be appreciated that the history data may include, for example, data from past results obtained from one or more previous pre-processing steps performed on the video data input to the pre-processor 110 (and/or another pre-processor) and/or other pre-processed video data input to the pre-processor 110 (and/or another pre-processor).

As noted above, the present principles are directed to a method and apparatus for automatically categorizing potential shot and scene detection issues.

Moreover, as noted above, one of many possible examples where identification of scenes in a pre-processing step is desirable is when the processing is performed on several scenes in parallel using separate processors. If a missed scene cut can be detected and categorization information generated therefore, improved performance can be obtained by, for example, breaking one longer scene into two shorter scenes resulting in more parallelization during encoding. Verification of all the shots/scenes results in better scene detection which could result in higher quality encoding and better performance at the time of encoding and re-encoding. The present principles provide a method and apparatus to achieve this identification and categorization.

One of many possible ways in which to implement this categorization is to identify and sort the shots/scenes according to their duration, based on the results of the initial scene detection algorithms. The scenes can be arranged in either an ascending or descending order and the actual position of the scene within the entire video content may also noted. A threshold value could be used, for example, that further classifies those scenes that are either shorter or longer than the threshold. In this way, the potential problem scenes, likely to be missed by one of the other pre-processing algorithms, could be found. The threshold could be a fixed value, which could depend on, but is not limited to, any of the following: the type of video that is being pre-processed; a running statistical analysis on the scene durations that are found. If the threshold is based on scene duration, for example, it may be set shorter for action films since they tend to have quicker scene cuts. Other types of movies may have longer scenes and so the threshold value would be set higher in order to categorize which scene are relatively longer or shorter.

Extra-long video scenes which are above the threshold value could be categorized separately if such scenes have a high-likelihood for errors by the other pre-processing scene/shot detection algorithms. Similarly, extra-short scenes that are usually flashes could be flagged as potential difficult scenes for subsequent processing. Alternatively, the top N percent and bottom M percent of the scenes could be separately categorized if they need special attention.

Categorization of scenes using scene length is just one method of sorting the scenes. The threshold parameter can be derived using other parameters of the uncompressed video content or statistics based on the entire video content after pre-processing is performed to derive those statistics. In any of these cases, the categorization is performed using those results.

This categorization makes down stream processing such as, for example, encoding, more precise, with improved quality, and more efficiency in performance.

Figure 2:
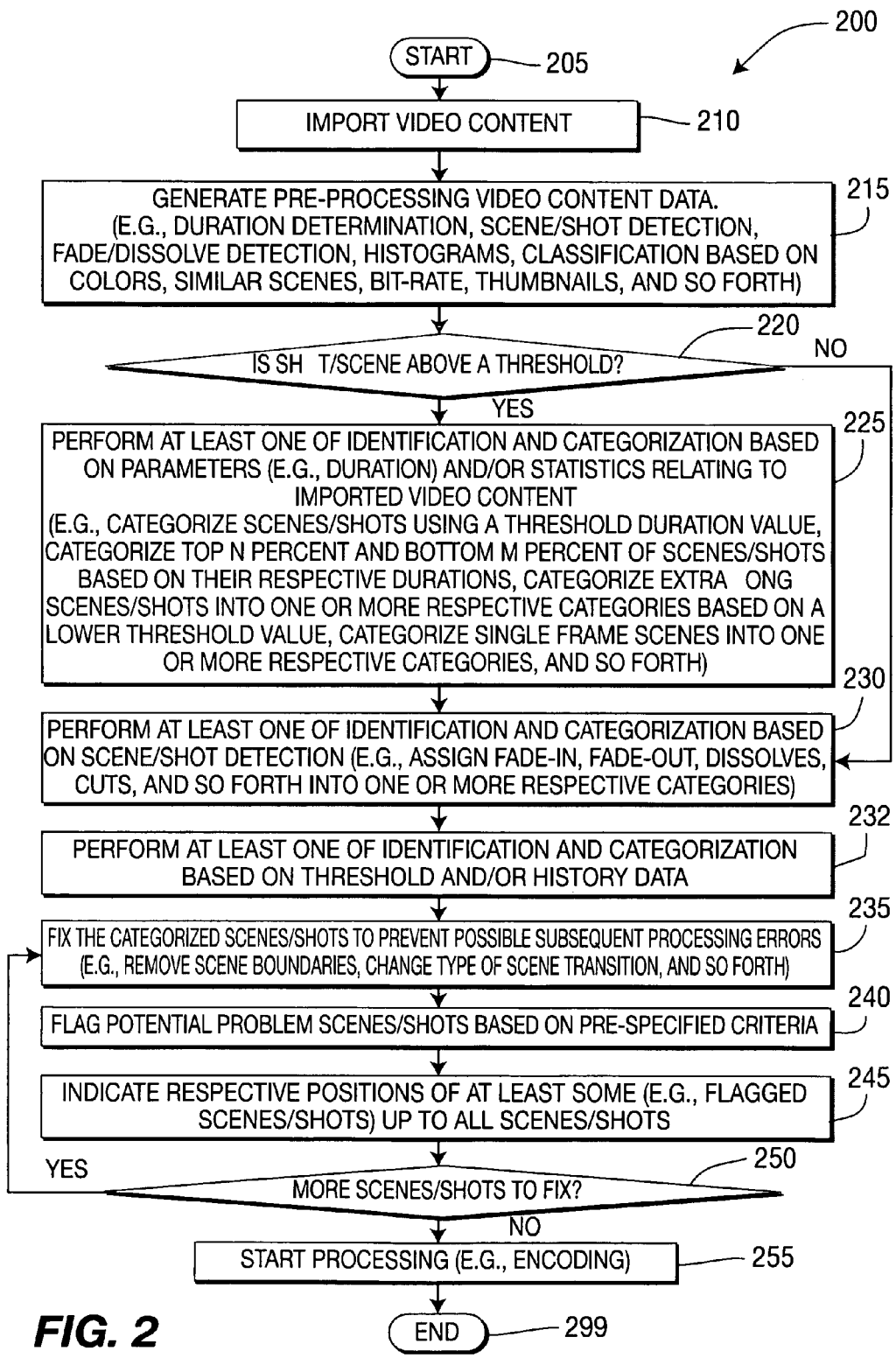
FIG. 2 is a flow diagram for an exemplary method for encoding video content in accordance with an embodiment of the present principles.

Turning to FIG. 2, an exemplary method for encoding video content in accordance with an embodiment of the present principles is indicated generally by the reference numeral 200.

The method 200 includes a start block 205 that passes control to a function block 210. The function block 210 imports video content, and passes control to a function block 215. The function block 215 generates pre-processing video content data, and passes control to a decision block 220. With respect to function block 215, the generated pre-processing video content data may include, but is not limited to, scene/shot detection, fade/dissolve detection, histograms, classification based on colors, similar scenes, bit-rate, thumbnails, and so forth.

The decision block 220 determines whether or not a shot/scene is above a preset threshold. If so, then control is passed to a function block 225. Otherwise, control is passed to a function block 230. With respect to function block 220, such preset threshold may correspond to, for example, duration.

The function block 225 performs at least one of identification and categorization based on duration length, and passes control to the function block 230. With respect to the function block 225, such categorization may involve, for example, optionally categorizing scenes/shots using a threshold duration value, optionally categorizing the top N percent and the bottom M percent of scenes/shots based on their respective durations, optionally categorizing extra long scenes/shots into one or more respective categories based on an upper threshold value (that is greater than the threshold duration value), and categorizing extra short scenes/shots into one or more respective categories based on a lower threshold value (that is less than the threshold duration value), categorizing single frame scenes into one or more respective categories. Of course, as noted above, the present principles are not limited to the preceding categorizations and, thus, other categorizations may also be used in accordance with the present principles, while maintaining the spirit of the present principles.

The function block 230 performs at least one of identification and categorization based on scene/shot detection, and passes control to a function block 232. With respect to the function block 230, such categorization may involve, for example, assigning any of the following into one or more respective categories: fade-ins; fade-outs; dissolves; cuts; and so forth.

The function block 232 performs at least one of identification and categorization based on a threshold and/or past data, relating to a likelihood of causing errors during subsequent processing, and passes control to the function block 235.

The function block 235 fixes the categorized scenes/shots to prevent possible subsequent processing errors, and passes control to a function block 240. The function block 240 flags potential problem scenes/shots based on pre-specified criteria, and passes control to a function block 245. With respect to the function block 240, potential problem scenes/shots that may be flagged may include, for example, one or more scenes/shots not fixed by function block 235, and one or more scenes/shots that were fixed by function block 240, depending on the pre-specified criteria. For example, while function block 235 fixes one or more categorized scenes/shots, such action may still not totally resolve any issues encountered during processing and, hence, flags such scenes/shots to make the subsequent processing "aware" of the same.

The function block 245 indicates respective positions of at least some (for example, the flagged scenes/shots per function block 240) up to all of the scenes/shots in the imported video content, and passes control to a decision block 250. The decision block 250 determines whether or not there are more scenes/shots to fix. If so, then control is returned to the function block 235. Otherwise, control is passed to a function block 255.

The function block 255 begins processing (e.g., encoding) of the video content, and passes control to an end block 299.

After categorization is achieved, the video content can be altered, by function block 235, using one or more methods including, but not limited to, adding or removing scene boundaries, changing the type of scene transition, or one of many other possible video effects.

Figure 3:
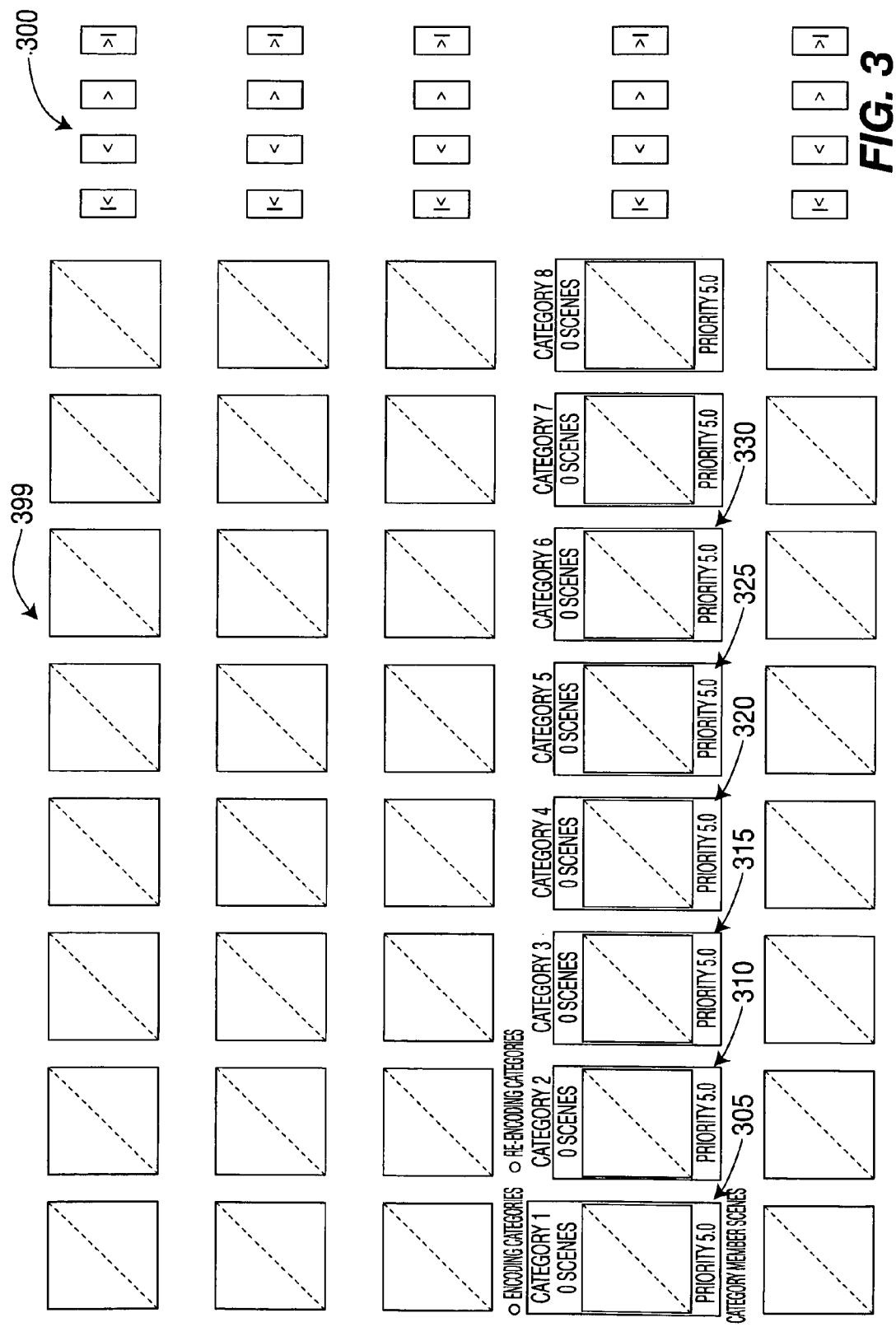
FIG. 3 is a diagram for an exemplary categorization of a video sequence in accordance with an embodiment of the present principles.

Turning to FIG. 3, an exemplary categorization of a video sequence in accordance with an embodiment of the present principles is indicated generally by the reference numeral 300.

The categorization 300 includes a default category 305, an extra long category 310, an extra short category 315, a fade-in category 320, a fade-out category 325, a dissolve category 330, and so forth.

The default category 305 may include, for example, all cuts.

The extra long category 310 may include, for example, the top one percent of extra long scenes based on sorting.

The extra short category 315 may include, for example, all one frame scenes and the bottom one percent of extra short scenes based on sorting.

The fade-in category 320 may include, for example, all fade-in shots/scenes found by the pre-processor 110.

The fade-out category 325 may include, for example, all fade-out shots/scenes found by the pre-processor 110.

The dissolve category 330 may include, for example, all dissolves shots/scenes found by the pre-processor 110.

An expansion of, for example, the extra long category 310 shows all scenes that belong within the extra long category 310. A user can select (e.g., click on) a category to look at all the members of the selected category.

It is to be appreciated that the preceding exemplary categories are merely illustrative and, thus, the present principles are not limited to solely these categories. That is, given the teachings of the present principles provided herein, one of ordinary skill in this and related arts will contemplate these and various other categories that may be used in accordance with the present principles, while maintaining the spirit of the present principles.

Moreover, it is to be appreciated that the exemplary categorization 300 shown with respect to FIG. 3 is so shown using a graphical user interface (GUI) 399 that allows a user to see the identifications and categorizations made in accordance with the present principles. Moreover, such GUI 399 allows a user to modify such categorizations as well as fix and scenes and/or shots flagged as potential problems. In another embodiment, the repair of such scenes and shots may be performed automatically. These and other variations of a GUI in accordance with the present principles are readily contemplated by one of ordinary skill in this and related arts, while maintaining the spirit of the present principles.

A description will now be given of some of the many attendant advantages/features of the present invention, some of which have been mentioned above. For example, one advantage/feature is an apparatus for categorizing pre-processing video information derived from video content prior to processing the video content. The apparatus includes a categorizer for identifying at least one of scenes and shots in the video content that have a likelihood of causing errors during subsequent processing based on at least the pre-processing video information. Moreover, the categorizer is for categorizing the identified scenes and shots into one or more respective categories based on at least the pre-processing video information.

Another advantage/feature is the apparatus having the categorizer as described above, wherein the pre-processing video information includes at least one of parameters of the video content and statistics of the video content, prior to processing.

Yet another advantage/feature is the apparatus having the categorizer as described above, wherein the pre-processing video information includes information corresponding to at least one of scene duration, shot duration, scene detection, shot detection, fade detection, dissolve detection, histograms, color, similarity with other scenes, similarity with other shots, bit rate, and thumbnails Still another advantage/feature is the apparatus having the categorizer as described above, wherein the categorizer uses a threshold duration value to at least one of identify and categorize at least one of the scenes and the shots.

Moreover, another advantage/feature is the apparatus having the categorizer that uses a threshold duration value as described above, wherein the threshold duration value is dynamically calculated based on information from a running statistical analysis performed with respect to the video content.

Further, another advantage/feature is the apparatus having the categorizer that uses the threshold duration value as described above, wherein the categorizer uses at least one of an upper threshold value and a lower threshold value to at least one of identify and categorize at least one of the scenes and the shots as extra long and extra short. The upper threshold value is greater than the threshold duration value and the lower threshold value is less than the threshold duration value.

Also, another advantage/feature is the apparatus having the categorizer that uses at least one of an upper threshold value and a lower threshold value as described above, wherein the categorizer flags any of the scenes categorized as extra short as potential difficult scenes for the subsequent processing.

Additionally, another advantage/feature is the apparatus having the categorizer as described above, wherein the categorizer at least one of identifies and categorizes at least one of a top N percent and a bottom M percent of at least one of the scenes and the shots based on their respective durations.

Moreover, another advantage/feature is the apparatus having the categorizer as described above, wherein the categorizer identifies and categorizes at least one of the scenes and the shots as having the likelihood of causing errors during the subsequent processing further based on at least one of a threshold and history data. The history data includes data for past results obtained from one or more previous pre-processing steps performed on at least one of the video data and other video data.

Further, another advantage/feature is the apparatus having the categorizer as described above, wherein the categorizer fixes the identified scenes and shots to prevent errors during the subsequent processing.

Also, another advantage/feature is the apparatus having the categorizer as described above, wherein the categorizer indicates a position of at least one of the scenes and the shots in the video content.

Additionally, another advantage/feature is the apparatus having the categorizer as described above, wherein the one or more categories correspond to at least one of fade-ins, fade-outs, dissolves, and cuts.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for categorizing pre-processing video information derived from video content prior to processing the video content, comprising:
 a categorizer for identifying at least one of scenes and shots in the video content that have a likelihood of causing errors during subsequent processing based on data from past results obtained from one or more previous pre-processing steps performed on said pre-processing video information or from a threshold scene duration value that further classifies those scenes that are either shorter or longer than the threshold scene duration value and that is dynamically calculated based on information from a running statistical analysis performed With respect to the video information, and categorizing the identified scenes and shots into one or more respective categories based on at least the pre-processing video information,
 wherein said categorizer uses at least one of an upper threshold value and a lower threshold value to at least one of the identifying and categorize at least one of the scenes and the shots as extra long and extra short, wherein the upper threshold value is greater than the threshold duration value and the lower threshold value is less than the threshold duration value.

2. The apparatus of claim 1, wherein the pre-processing video information comprises at least one of parameters of the video content and statistics of the video content, prior to processing.

3. The apparatus of claim 1, wherein the pre-processing video information comprises information corresponding to at least one of scene duration, shot duration, scene detection, shot detection, fade detection, dissolve detection, histograms, color, similarity with other scenes, similarity with other shots, bit rate, and thumbnails.

4. The apparatus of claim 1, wherein said categorizer compares a scene duration value to a threshold value to identify and categorize at least one of the scenes and the shots.

5. The apparatus of claim 4, wherein the threshold duration value is dynamically calculated based on information from a running statistical analysis performed with respect to the video content.

6. The apparatus of claim 1 wherein said categorizer flags any of the scenes categorized as extra short as potential difficult scenes for the subsequent processing.

7. The apparatus of claim 1, wherein said categorizer identifies and categorizes at least one of a top N percent and a bottom M percent of at least one of the scenes and the shots based on their respective durations.

8. The apparatus of claim 1, wherein said categorizer identifies and categorizes at least one of the scenes and the shots as having the likelihood of causing errors during the subsequent processing further based on at least one of a threshold and history data, wherein the history data comprises data for past results obtained from one or more previous pre-processing steps performed on at least one of the video data and other video data.

9. The apparatus of claim 1, wherein said categorizer fixes the identified scenes and shots to prevent errors during the subsequent processing.

10. The apparatus of claim 1, wherein said categorizer indicates a position of at least one of the scenes and the shots in the video content.

11. The apparatus of claim 1, wherein the one or more categories correspond to at least one of fade-ins, fade-outs, dissolves, and cuts.

12. A method for categorizing pre-processing video information derived from video content prior to processing the video content, comprising:
 identifying at least one of scenes and shots in the video content that have a likelihood of causing errors during subsequent processing based on data from past results obtained from one or more previous pre-processing steps performed on said pre-processing video information or from a threshold scene duration value that further classifies those scenes that are either shorter or longer than the threshold scene duration value and that is dynamically calculated based on information from a running statistical analysis performed with respect to the video information; and
 categorizing the identified scenes and shots into one or more respective categories based on at least the pre-processing video information,
 wherein at least one of said identifying step and said categorizing step use at least one of an upper threshold and a lower threshold to at least one of the identifying and categorize at least one of the scenes and the shots as extra long and extra short, wherein the upper threshold value is greater than the threshold duration value and the lower threshold value is less than the threshold duration value.

13. The method of claim 12, wherein the pre-processing video information comprises at least one of parameters of the video content and statistics of the video content, prior to processing.

14. The method of claim 12, wherein the pre-processing video information comprises information corresponding to at least one of scene duration, shot duration, scene detection, shot detection, fade detection, dissolve detection, histograms, color, similarity with other scenes, similarity with other shots, bit rate, and thumbnails.

15. The method of claim 12, wherein a threshold duration value is used to at least one of identify and categorize at least one of the scenes and the shots.

16. The method of claim 15, wherein the threshold duration value is dynamically calculated based on information from a running statistical analysis performed with respect to the video content.

17. The method of claim 12, wherein said categorizing step flags any of the scenes categorized as extra short as potential difficult scenes for the subsequent processing.

18. The method of claim 12, wherein at least one of said identifying step and said categorizing step at least one of respectively identifies and categorizes at least one of a top N percent and a bottom M percent of at least one of the scenes and the shots based on their respective durations.

19. The method of claim 12, wherein at least one of said identifying step and said categorizing step respectively identifies and categorizes at least one of the scenes and the shots as having the likelihood of causing errors during the subsequent processing further based on at least one of a threshold and history data, wherein the history data comprises data for past results obtained from one or more previous pre-processing steps performed on at least one of the video data and other video data.

20. The method of claim 12, further comprising fixing the identified scenes and shots to prevent errors during the subsequent processing.

21. The method of claim 12, further comprising indicating a position of at least one of the scenes and the shots in the video content.

22. The method of claim 12, wherein the one or more categories correspond to at least one of fade-ins, fade-outs, dissolves, and cuts.

* * * * *